US009042296B2

(12) United States Patent
Palanki et al.

(10) Patent No.: US 9,042,296 B2
(45) Date of Patent: May 26, 2015

(54) SYNCHRONIZATION OF DEVICES IN A WIRELESS COMMUNICATION NETWORK

(75) Inventors: Ravi Palanki, San Diego, CA (US);
Aamod D. Khandekar, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 538 days.

(21) Appl. No.: 12/841,051

(22) Filed: Jul. 21, 2010

(65) Prior Publication Data

US 2011/0176483 A1  Jul. 21, 2011

Related U.S. Application Data

(60) Provisional application No. 61/227,946, filed on Jul. 23, 2009, provisional application No. 61/295,594, filed on Jan. 15, 2010.

(51) Int. Cl.
*H04W 56/00* (2009.01)
*H04W 92/20* (2009.01)

(52) U.S. Cl.
CPC ...... *H04W 56/0045* (2013.01); *H04W 56/0015* (2013.01); *H04W 92/20* (2013.01)

(58) Field of Classification Search
CPC ............... H04W 56/0015; H04W 56/0045; H04W 92/20
USPC .................................. 370/252, 328; 455/456
See application file for complete search history.

(56) References Cited

U.S. PATENT DOCUMENTS

| 6,493,539 B1 | 12/2002 | Falco et al. |
| 6,788,663 B2 | 9/2004 | Rowitch |
| 7,006,534 B1 | 2/2006 | Nemoto |

(Continued)

FOREIGN PATENT DOCUMENTS

| CN | 1370023 A | 9/2002 |
| EP | 1073216 A2 | 1/2001 |

(Continued)

OTHER PUBLICATIONS

3GPP TS 36.401 V8.5.0 (Mar. 2009), 3rd Generation Partnership Project; Technical Specification Group Radio Access Network; Evolved Universal Terrestrial Radio Access Network (E-UTRAN); Architecture description (Release 8).

(Continued)

*Primary Examiner* — Pao Sinkantarakorn
*Assistant Examiner* — Richard Chang
(74) *Attorney, Agent, or Firm* — John J. Ketchum

(57) ABSTRACT

Techniques for synchronizing devices in a wireless network are described. In an aspect, a device determines a receive time for a base station, obtains a time offset for the base station from a network entity, and sets its transmit time based on the receive time and the time offset for the base station. The time offset compensates for the degree by which the base station is asynchronous with respect to a reference time, e.g., UTC time. In another aspect, a device determines and sends time difference information (e.g., a time offset or a TDOA measurement) for at least one base station to support synchronization of other devices. In yet another aspect, a network entity supports synchronization of devices, receives time difference information for at least one base station, and determines at least one time offset for the at least one base station based on the time difference information.

46 Claims, 6 Drawing Sheets

(56) References Cited

U.S. PATENT DOCUMENTS

| | | | |
|---|---|---|---|
| 2001/0039192 A1* | 11/2001 | Osterling et al. | 455/502 |
| 2002/0098839 A1* | 7/2002 | Ogino et al. | 455/424 |
| 2002/0107028 A1* | 8/2002 | Rantalainen et al. | 455/456 |
| 2004/0130485 A1* | 7/2004 | Rapoport et al. | 342/357.03 |
| 2005/0136835 A1 | 6/2005 | Suwa | |
| 2007/0053340 A1* | 3/2007 | Guilford | 370/350 |
| 2007/0066231 A1* | 3/2007 | Duffett-Smith et al. | 455/67.11 |
| 2007/0218922 A1* | 9/2007 | Syrjarinne | 455/456.1 |
| 2008/0117835 A1 | 5/2008 | Grilli et al. | |
| 2010/0208720 A1 | 8/2010 | Fujishima et al. | |

FOREIGN PATENT DOCUMENTS

| | | |
|---|---|---|
| EP | 1675279 A2 | 6/2006 |
| EP | 1701564 A1 | 9/2006 |
| EP | 1983786 A1 | 10/2008 |
| EP | 2048899 A1 | 4/2009 |
| JP | 2000270366 A | 9/2000 |
| JP | 2001069559 A | 3/2001 |
| JP | 2003110583 A | 4/2003 |
| JP | 2005184193 A | 7/2005 |
| JP | 2006287663 A | 10/2006 |
| JP | 2007053753 A | 3/2007 |
| JP | 2008228098 A | 9/2008 |
| JP | 2009052982 A | 3/2009 |
| WO | WO9827684 A1 | 6/1998 |
| WO | 2005057973 A1 | 6/2005 |
| WO | 2007076510 A2 | 7/2007 |
| WO | 2009048094 A1 | 4/2009 |

OTHER PUBLICATIONS

International Search Report and Written Opinion—PCT/US2010/043159, International Search Authority—European Patent Office—Mar. 4, 2011.

European Search Report—EP12181664—Search Authority—The Hague—Sep. 21, 2012.

European Search Report—EP12181667—Search Authority—The Hague—Sep. 21, 2012.

Taiwan Search Report—TW099124365—TIPO—Apr. 18, 2013.

* cited by examiner

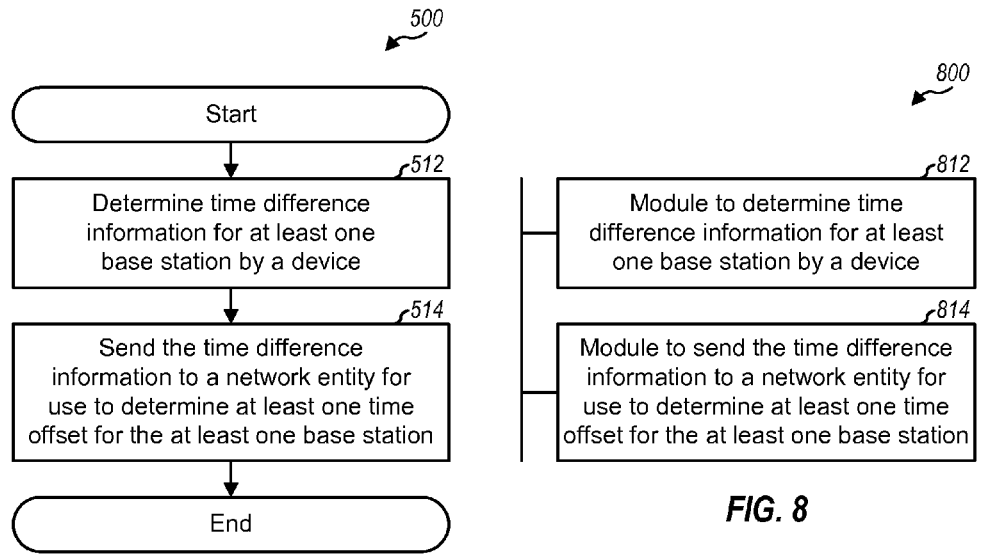
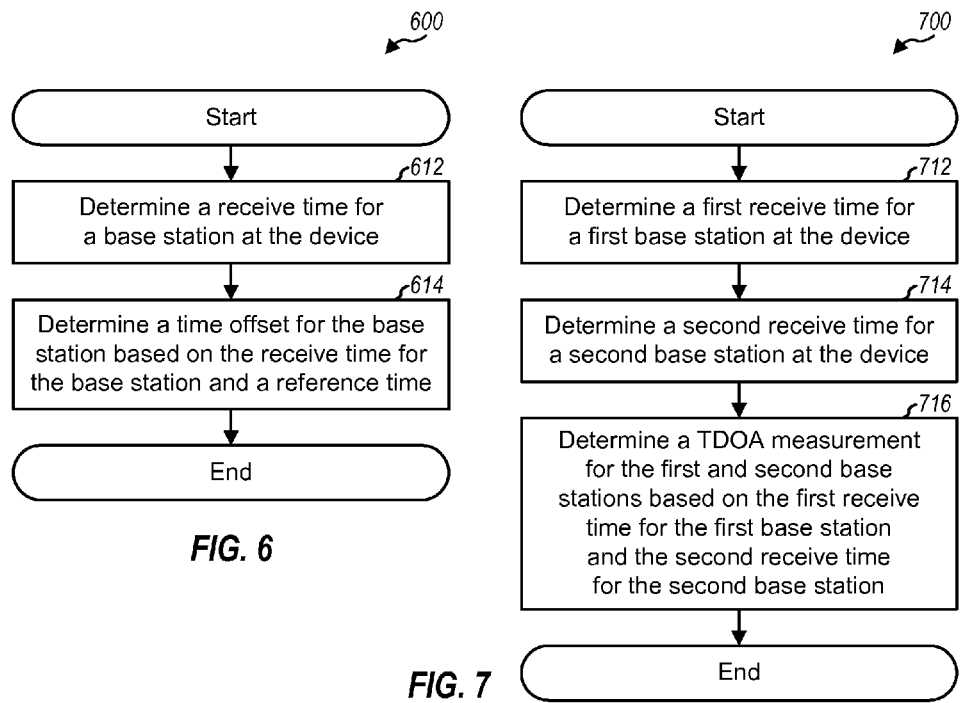

SYNCHRONIZATION OF DEVICES IN A WIRELESS COMMUNICATION NETWORK

The present application claims priority to provisional U.S. Application Ser. No. 61/227,946, entitled "SYNCHRONIZATION USING ASYNCHRONOUS NODEBS," filed Jul. 23, 2009, and provisional U.S. Application Ser. No. 61/295,594, entitled "SYNCHRONIZATION USING ASYNCHRONOUS NODEBS," filed Jan. 15, 2010, both assigned to the assignee hereof and incorporated herein by reference.

BACKGROUND

I. Field

The present disclosure relates generally to communication, and more specifically to techniques for synchronization in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of macro base stations that can support communication for a number of devices. A device may be a home base station, a user equipment (UE), a relay, etc. It may be desirable for the devices to be synchronized in time. Time synchronization may be achieved by having the devices (i) directly align their timing to a reference time source or (ii) indirectly align their timing to the reference time source via macro base stations. The reference time source may be a Global Navigation Satellite System (GNSS) such as Global Positioning System (GPS). However, a device may not have GNSS capability and/or may not be able to receive GNSS signals (e.g., due to deployment indoors). Furthermore, the macro base stations may be asynchronous. It may be desirable to perform synchronization even in such scenarios.

SUMMARY

Techniques for synchronizing devices in a wireless communication network are described herein. The devices may not have GNSS capability and/or GNSS coverage, and the macro base stations in the wireless network may be asynchronous. Nevertheless, it may be desirable to synchronize the devices in order to mitigate interference and/or obtain other benefits.

In an aspect, a device may set its transmit time based on a time offset for a base station. In one design, the device may determine a receive time for the base station at the device. The device may obtain the time offset for the base station from a network entity. The device may then set its transmit time based on the receive time and the time offset for the base station. The time offset may compensate for the degree by which the base station is asynchronous with respect to a reference time, which may be coordinated universal time (UTC).

In another aspect, a device may determine and send time difference information for one or more base stations to support synchronization of other devices. In one design, the time difference information may comprise a time offset for a base station. The device may determine a receive time for the base station at the device. The device may then determine the time offset for the base station based on the receive time for the base station and a reference time (e.g., UTC time). In another design, the time difference information may comprise a time difference of arrival (TDOA) measurement for a pair of base stations. The device may determine a first receive time for a first base station and a second receive time for a second base station at the device. The device may determine a TDOA measurement for the first and second base stations based on the receive times for these base stations. TDOA measurements for a plurality of base stations may be used to determine time offsets for these base stations.

In yet another aspect, a network entity may support synchronization of devices. The network entity may receive time difference information for at least one base station and may determine at least one time offset for the at least one base station based on the time difference information. The network entity may provide the at least one time offset for the at least one base station to devices for use to set the transmit time of each device. In one design, the time difference information may comprise the at least one time offset for the at least one base station and may be received from one or more devices. In another design, the time difference information may comprise TDOA measurements for a plurality of base stations. The network entity may determine a plurality of time offsets for the plurality of base stations based on the TDOA measurements.

Various aspects and features of the disclosure are described in further detail below.

BRIEF DESCRIPTION OF THE DRAWINGS

FIG. 5 shows a process for supporting synchronization by a device.

FIG. 6 shows a process for determining a time offset for a base station.

FIG. 7 shows a process for determining a TDOA measurement.

FIG. 8 shows an apparatus for supporting synchronization by a device.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
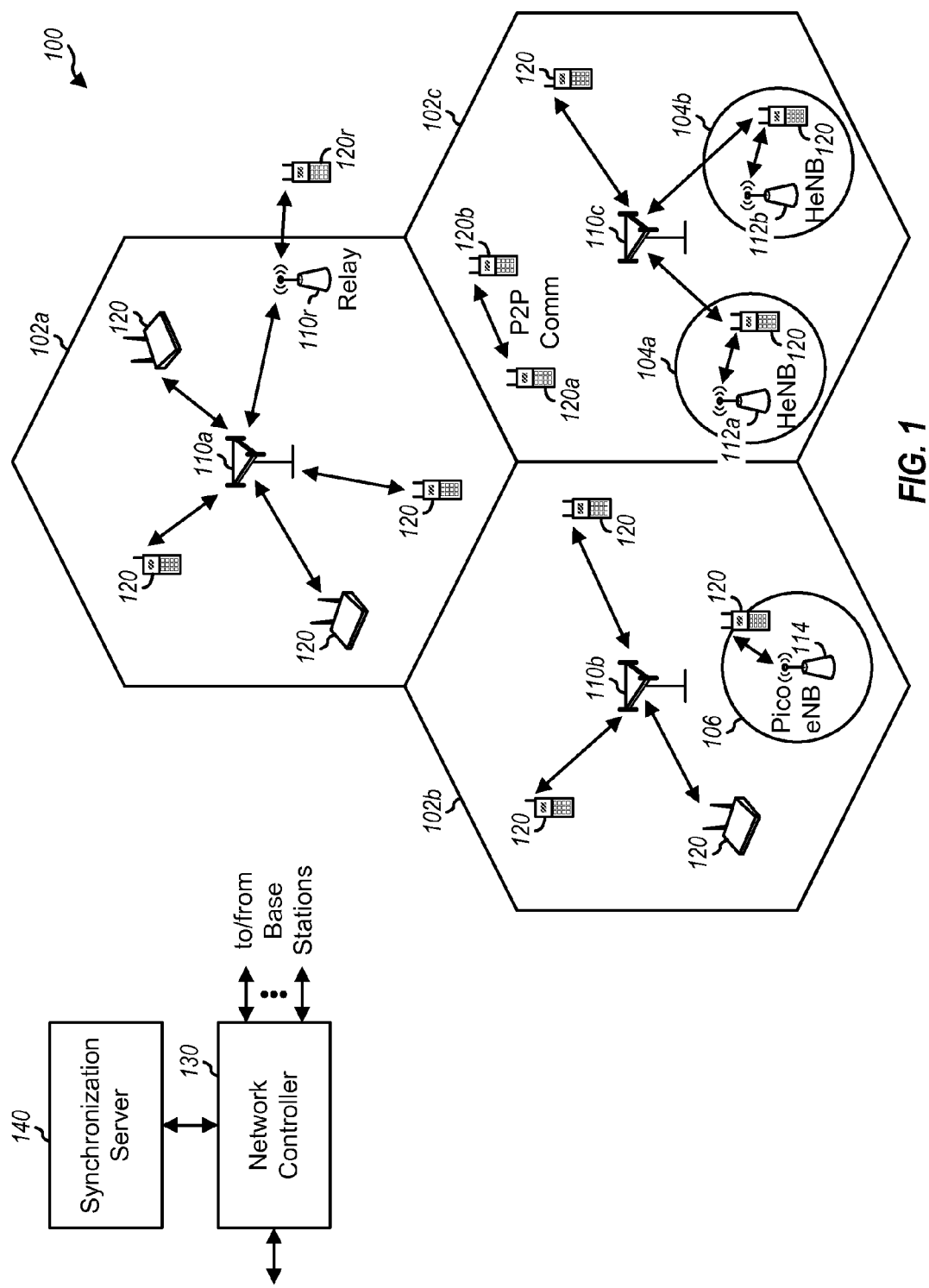
FIG. 1 shows a wireless communication network.

FIG. 1 shows a wireless communication network 100, which may include a number of base stations and other network entities. A base station may be an entity that communicates with the UEs and may also be referred to as a Node B, an evolved Node B (eNB), an access point, etc. The terms "base station" and "eNB" are used interchangeably herein. An eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area.

An eNB may provide communication coverage for a macro cell, a pico cell, a femto cell, and/or other types of cell. In the example shown in FIG. 1, eNBs 110a, 110b and 110c may be macro eNBs for macro cells 102a, 102b and 102c, respectively. eNBs 112a and 112b may be home eNBs (HeNBs) for femto cells 104a and 104b, respectively. eNB 114 may be a pico eNB for a pico cell 106.

Wireless network 100 may also include relays. A relay may be an entity that can receive a transmission of data from an upstream station (e.g., an eNB or a UE) and send a transmission of the data to a downstream station (e.g., a UE or an eNB). A relay may also be a UE that can relay transmissions for other UEs. In the example shown in FIG. 1, a relay 110r may communicate with macro eNB 110a and a UE 120r in order to facilitate communication between eNB 110a and UE 120r. A relay may also be referred to as a relay station, a relay eNB, a relay base station, etc.

UEs 120 may be dispersed throughout the wireless network, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB. A UE may also communicate peer-to-peer (P2P) with other UEs. In the example shown in FIG. 1, UEs 120a and 120b may communicate peer-to-peer and may also be capable of communicating with eNBs, e.g., when not engaged in P2P communication or possibly concurrent with P2P communication.

A network controller 130 may couple to a set of eNBs and may provide coordination and control for these eNBs. Network controller 130 may be a Mobility Management Entity (MME), a Radio Network Controller (RNC), a Base Station Controller (BSC), a Mobile Switching Center (MSC), etc. Network controller 130 may communicate with the eNBs via a backhaul. The eNBs may also communicate with one another, e.g., directly or indirectly via a wireless or wireline backhaul. A synchronization server 140 may coupled to network controller 130 and may support synchronization of eNBs, relays, and UEs, as described below.

Wireless network 100 may support synchronous or asynchronous operation. For synchronous operation, the eNBs may have similar frame timing, and transmissions from different eNBs may be aligned in time. The eNBs may achieve synchronization based on a GNSS such as the United States Global Positioning System (GPS), the European Galileo system, the Russian GLONASS system, the Chinese COMPASS system, the Indian Regional Navigational Satellite System (IRNSS), the Japanese Quasi-Zenith Satellite System (QZSS), etc. For simplicity, the term "GNSS" generically refers to any GNSS in the description herein. For asynchronous operation, the eNBs may have different frame timing, and transmissions from different eNBs may not be aligned in time.

It may be desirable to achieve time and/or frequency synchronization for devices in the wireless network. A device may be a HeNB, a pico eNB, a relay, a UE, etc. However, a device may not have GNSS capability, or may have GNSS capability but may be unable to receive GNSS signals. Hence, the device may not be able to achieve synchronization via GNSS. In such a scenario, the device may perform self-synchronization using network listening. For network listening, the device may receive signals from different macro eNBs and may set its time and/or frequency based on the received signals. However, the macro eNBs may not be synchronized (e.g., in Europe). In such a case, the device may be within the coverage of different macro eNBs and may have different time references for these macro eNBs. The different time references may create significant interference issues at cell boundaries, especially in a time division duplex (TDD) wireless network. This may hinder deployments of HeNBs when only asynchronous macro eNBs are present.

In an aspect, a device (e.g., a HeNB, a UE, or a relay) may set its transmit time based on a receive time of a macro eNB but may apply a time offset to compensate for the degree by which the macro eNB is asynchronous with respect to a reference time (e.g., UTC time). For example, if the receive time of the macro eNB is 10 microseconds (μs) off the reference time, then the device may advance its transmit time by 10 μs so that it is approximately aligned with the reference time. Different macro eNBs may have different transmit times and may thus be associated with different time offsets. Different devices may set their transmit times based on the receive times of different macro eNBs and may be approximately synchronized based on different time offsets for different macro eNBs. The techniques may be used to achieve synchronization even when the devices have no GNSS capability or GNSS coverage but can receive signals from macro eNBs.

Figure 2:
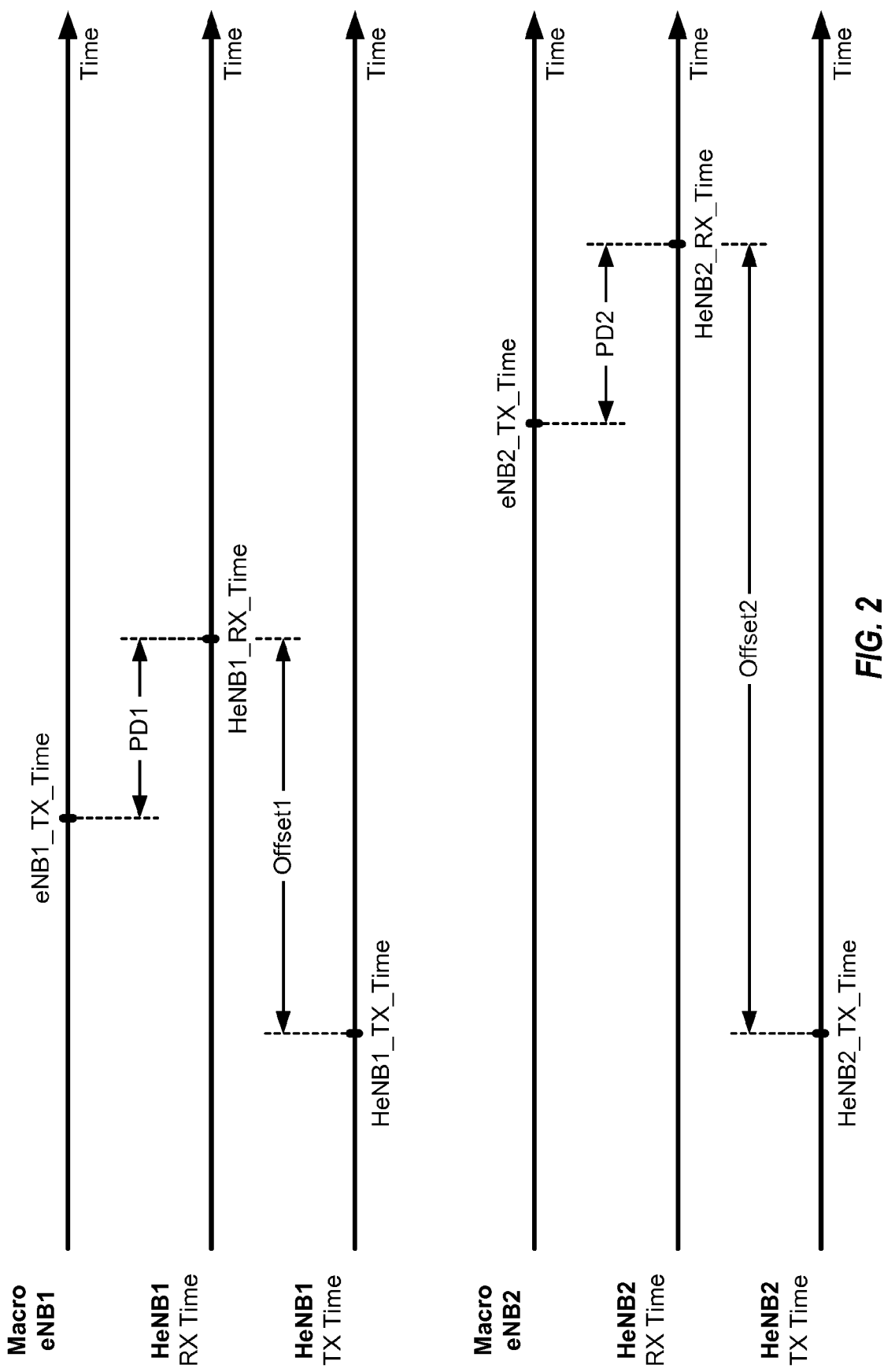
FIG. 2 shows two devices setting their transmit times based on the receive times for two base stations.

FIG. 2 shows two HeNBs setting their transmit times based on two asynchronous macro eNBs. A first macro eNB (eNB1) may transmit a downlink signal comprising one or more synchronization signals at a transmit time of eNB1_TX_Time. A first HeNB (HeNB1) may receive the downlink signal from eNB1 at a receive time of HeNB1_RX_Time, which may be delayed by a propagation delay of PD1 from the transmit time of eNB1. In one design, HeNB1 may set its transmit time of HeNB1_TX_Time based on the receive time and a time offset for eNB1, e.g., HeNB1_TX_Time=HeNB1_RX_Time−Offset1, where Offset1 is the time offset for eNB1.

Similarly, a second macro eNB (eNB2) may transmit a downlink signal comprising one or more synchronization signals at a transmit time of eNB2_TX_Time. A second HeNB (HeNB2) may receive the downlink signal from eNB2 at a receive time of HeNB2_RX_Time, which may be delayed by a propagation delay of PD2 from the transmit time of eNB2. In one design, HeNB2 may set its transmit time of HeNB2_TX_Time based on the receive time and a time offset for eNB2, e.g., HeNB2_TX_Time=HeNB2_RX_Time−Offset2, where Offset2 is the time offset for eNB2.

As shown in FIG. 2, HeNB1 and HeNB2 may have approximately synchronous transmit times even though the HeNBs may set their transmit times based on asynchronous macro eNBs. The time offset for each macro eNB may compensate for the degree by which that macro eNB is asynchronous with respect to the reference time.

In one design that is shown in FIG. 2, the transmit time of a device (e.g., an HeNB or a UE) may be set based on the receive time and a time offset for a macro eNB, as follows:

$$\text{Device\_TX\_Time} = \text{Device\_RX\_Time} - \text{Offset}, \quad \text{Eq (1)}$$

where
Device_RX_Time is the receive time of a signal from the macro eNB at the device,
Offset is a time offset for the macro eNB, and
Device_TX_Time is the transmit time of the device.

In another design, the transmit time of a device may be set based on the receive time and a time offset for a macro eNB as well as the propagation delay between the macro eNB and the device, as follows:

$$\text{Device\_TX\_Time} = \text{Dev\_RX\_Time} - \text{Offset} - \text{PD}, \quad \text{Eq (2)}$$

where
PD is the propagation delay between the macro eNB and the device.

The propagation delay may be estimated based on round trip delay (RTD) measurement, received signal strength measurement, and/or other measurements. The propagation delay may also be set to an average or expected propagation delay for all devices within the coverage or the macro eNB. The propagation delay may also be set to a particular percentage (e.g., one half) of the cyclic prefix length.

In general, a device may set its transmit time based on one or more time offsets for one or more macro eNBs. The device may set its transmit time based on a single time offset for a single macro eNB, e.g., as shown in equation (1) or (2). The device may also set its transmit time based on multiple time offsets for multiple macro eNBs. For example, the device may determine its initial transmit time for each macro eNB based on the received time and the time offset for that macro eNB and may then average its initial transmit times for all macro eNBs to obtain a final transmit time for the device.

In one design, synchronization server 140 in FIG. 1 (or some other designated network entity) may provide time offsets for macro eNBs to devices to enable the devices to set their transmit times. Synchronization server 140 may obtain time difference information from UEs, HeNBs, location management units (LMUs), and/or other entities that can receive signals from macro eNBs and have GNSS capability. Synchronization server 140 may use the time difference information to determine a time offset for each macro eNB.

The time offsets for macro eNBs may be determined in various manners. In a first design, the time offset for a macro eNB may be determined based on a reference time (e.g., UTC time). A device may be within the coverage of a macro eNB and may determine UTC time based on its GNSS capability. The device may also determine the receive time of the macro eNB at the device and may determine a time offset for the macro eNB, as follows:

$$\text{Offset} = \text{Device\_RX\_Time} - UTC \text{ Time}. \quad \text{Eq (3)}$$

The device may report the time offset and a cell identity (ID) of the macro eNB to synchronization server 140. Synchronization server 140 may provide the time offset to other devices within the coverage of the macro eNB. These devices can set their transmit times based on their receive times for the macro eNB as well as the time offset for the macro eNB, e.g., as shown in equation (1). These devices can then transmit at approximately UTC time.

In general, synchronization server 140 may receive one or more time offsets from one or more devices for a macro eNB. Synchronization server 140 may average all of the time offsets to obtain a single time offset for the macro eNB. The averaging may give more weight to (i) a more accurate time offset (e.g., from a device with better GNSS coverage), or (ii) a more recently obtained time offset, or (iii) a time offset from a device near the coverage edge of the macro eNB, or (iv) some other time offset. The time offset of the macro eNB may be updated periodically to account for timing drift at the macro eNB due to frequency error.

In a second design, the time offsets for macro eNBs may be determined based on TDOA measurements for different macro eNBs. Devices within the coverage of the macro eNBs may measure TDOAs between different macro eNBs. In one design, the TDOA between two macro eNBx and eNBy at a given device may be expressed as:

$$\text{TDOA}(x,y) = \text{Device\_RX\_Time}(x) - \text{Device\_RX\_Time}(y), \quad \text{Eq (4)}$$

where
Device_RX_Time(x) is the receive time for macro eNBx at the device,
Device_RX_Time(y) is the receive time for macro eNBy at the device, and
TDOA(x, y) is a TDOA measurement for macro eNBx and eNBy.

In another design, the TDOA between eNBx and eNBy may be expressed as:

$$\text{TDOA}(x,y) = \{\text{Device\_RX\_Time}(x) - \text{eNBx\_Offset}\} - \{\text{Device\_RX\_Time}(y) - \text{eNBy\_Offset}\}, \quad \text{Eq (5)}$$

where
eNBx_Offset is a time offset for macro eNBx, and
eNBy_Offset is a time offset for macro eNBy.

For the design in equation (5), the receive time for each macro eNB may be adjusted by the time offset for that macro eNB. The adjusted receive times for all macro eNBs may be approximately synchronous by removing the time offset for each macro eNB.

Different devices may obtain TDOA measurements for different macro eNBs and may report the TDOA measurements to synchronization server 140. Synchronization server 140 may compute the time offsets for the macro eNBs based on the reported TDOA measurements. The second design may support synchronization of devices communicating with asynchronous macro eNBs without requiring GNSS capability at any device.

In one design, the time offsets for the macro eNBs may be determined based on the reported TDOA measurements using minimum mean square error (MMSE) computation. All available TDOA measurements may be used to determine the time offsets in order to reduce the effects of measurement false alarms (e.g., large measurement error due to picking wrong peak). The computation of the time offsets based on MMSE may be illustrated with an example. In this example, five macro eNBs denoted as eNB1 through eNB5 may be present and may have true time offsets (e.g., relative to UTC time) given in the first column of Table 1. Seven TDOA measurements may be obtained for the five macro eNBs and, for simplicity, may be error free. The seven TDOA measurements are given in the second column of Table 1 and include one duplicate TDOA measurement for eNB3 and eNB5.

TABLE 1

| True Time Offset | TDOA Measurements |
|---|---|
| eNB1_Offset = 2 | TDOA(2, 1) = eNB2_Offset − eNB1_Offset = −1 |
| eNB2_Offset = 1 | TDOA(3, 2) = eNB3_Offset − eNB2_Offset = 2 |
| eNB3_Offset = 3 | TDOA(5, 2) = eNB5_Offset − eNB2_Offset = 0 |
| eNB4_Offset = 0 | TDOA(5, 3) = eNB5_Offset − eNB3_Offset = −2 |
| eNB5_Offset = 1 | TDOA(5, 3) = eNB5_Offset − eNB3_Offset = −2 |
|  | TDOA(4, 3) = eNB4_Offset − eNB3_Offset = −3 |
|  | TDOA(5, 4) = eNB5_Offset − eNB4_Offset = 1 |

The TDOA measurements may be expressed in matrix form as follows:

$$y = Hx, \quad \text{Eq (6)}$$

where x is a vector of time offsets for the macro eNBs, which are the unknowns to be determined, H is a measurement indicator matrix identifying the pair of macro eNBs for each TDOA measurement, and y is a vector of TDOA measurements for the macro eNBs.

For the example described above and shown in Table 1, measurement indicator matrix H and TDOA measurement vector y may be expressed as:

$$H = \begin{bmatrix} -1 & 1 & 0 & 0 & 0 \\ 0 & -1 & 1 & 0 & 0 \\ 0 & -1 & 0 & 0 & 1 \\ 0 & 0 & -1 & 0 & 1 \\ 0 & 0 & -1 & 0 & 1 \\ 0 & 0 & -1 & 1 & 0 \\ 0 & 0 & 0 & -1 & 1 \end{bmatrix}$$

and $$y = \begin{bmatrix} -1 \\ 2 \\ 0 \\ -2 \\ -2 \\ -3 \\ 1 \end{bmatrix}.$$

The time offsets may be determined based on MMSE, as follows:

$$x = Vy, \quad \text{and Eq (7)}$$

$$V = H^H(HH^H + \sigma_n^2 I)^{-1}, \quad \text{Eq (8)}$$

where

I is an identity matrix, $\sigma_n^2$ is a noise variance (e.g., $\sigma_n^2 = 0.001$) to make a matrix invertible, V is an MMSE solution matrix, and "$^H$" denotes a Hermetian or conjugate transpose.

For the example shown in Table 1, solution matrix V and time offset vector x may be given as:

$$V = \begin{bmatrix} -0.80 & -0.30 & -0.30 & 0.00 & 0.00 & -0.10 & 0.10 \\ 0.20 & -0.30 & -0.30 & 0.00 & 0.00 & -0.10 & 0.10 \\ 0.20 & 0.28 & 0.12 & -0.17 & -0.17 & -0.18 & 0.02 \\ 0.20 & 0.20 & 0.20 & 0.00 & 0.00 & 0.40 & -0.40 \\ 0.20 & 0.12 & 0.28 & 0.17 & 0.17 & -0.02 & 0.18 \end{bmatrix}$$

and $$x = \begin{bmatrix} 0.60 \\ -0.40 \\ 1.60 \\ -1.40 \\ -0.40 \end{bmatrix}.$$

The MMSE solution may provide five time offsets for the five macro eNBs such that the sum of all time offsets is equal to zero. The true time offsets for the five macro eNBs may be obtained by adding a common time offset of +1.40 to each time offset provided by the MMSE solution. The common time offset may be obtained via a time offset for a macro eNB computed based on UTC time.

In one design, the time offset for one macro eNB may be set to zero if the common time offset is not available. For the example above, the time offset for eNB1 may be set to zero, and the time offsets for eNB2, eNB3, eNB4 and eNB5 may then be equal to −1, 1, −2, and −1, respectively. Since eNB1 has a true time offset of 2 and its time offset is set to 0, the time offsets for all remaining macro eNBs are also off by 2 from their true time offsets. In this design, the devices within the coverage of the five macro eNBs may track the timing of eNB1 whose time offset is set to zero.

The timing of each macro eNB may drift at a rate determined based on the frequency error of that macro eNB. The timing of all devices may then drift in similar manner as the macro eNB whose time offset is set to zero. In one design, the time offsets for different macro eNBs may be set to zero in different time intervals. For example, the time offset for eNB1 may be set to zero in a first time interval, then the time offset for eNB2 may be set to zero in a second time interval, then the time offset for eNB3 may be set to zero in a third time interval, etc. By setting the time offsets for different macro eNBs to zero in different time intervals, the devices may track the mean/average timing drift of all macro eNBs instead of any one macro eNB. The mean time drift may be much smaller than the time drift of any one macro eNB.

As shown in equations (8), solution matrix V may be dependent on measurement indicator matrix H, which may be defined for a set of TDOA measurements used to compute the time offsets for a set of macro eNBs. Matrix H may be large for a large number of macro eNBs or a large number of TDOA measurements. The computational complexity of matrix V may be dependent on the size of matrix H. To reduce computational complexity, the macro eNBs in the wireless network may be partitioned into clusters. Each cluster may correspond to a set of macro eNBs that may be fully connected, so that from any macro eNB to any other macro eNB there is a path through TDOA measurement 'edges'. For each cluster, matrix H and vector y may be defined for the macro eNBs in that cluster, and vector x may be computed independently for the cluster to obtain time offsets (with a common time offset) for the macro eNBs in the cluster.

The time offset computation may then be repeated by treating each cluster as a node. The clusters may be partitioned into groups, and each group may correspond to a set of clusters. For each group, matrix H and vector y may be defined for the clusters in the group, with vector y including TDOA measurements that are inter-clusters. Each TDOA measurement may be modified to remove the intra-cluster common time offset. For example, a TDOA measurement for a pair of eNBx and eNBy may be given as:

$$TDOA(x,y) = RX\_Time(x) - RX\_Time(y), \quad \text{Eq (9)}$$

where $RX\_Time(x)$ and $RX\_Time(y)$ are receive times for eNBx and eNBy at a particular device. eNBx may belong in cluster 1, and eNBy may belong in cluster 2.

A time offset between clusters 1 and 2 may be computed as follows:

$$Offset(1, 2) = Cluster1\_Offset - Cluster2\_Offset \quad \text{Eq (10)}$$
$$= TDOA(x, y) - eNBx\_Offset + eNBy\_Offset,$$

where eNBx_Offset and eNBy_Offset may be time offsets for eNBx and eNBy provided by the time offset computation for clusters 1 and 2, respectively.

The TDOA measurements for macro eNBs in clusters 1 and 2 may then be adjusted by Offset (1, 2). Offsets for other pairs of clusters may be computed in similar manner and used to adjust the TDOA measurements for macro eNBs in these clusters. Vector x may then be computed independently for each group to obtain time offsets (with a common time offset) for the clusters in the group. After the time offset computation is completed, the mean time offset for all clusters in the group may be subtracted from the time offset for each macro eNB to follow the mean time drift.

Time offset computation for a hierarchical structure with two levels has been described above. In general, the macro eNBs in the wireless network may be partitioned in a hierarchical manner with any number of levels. The size of the cluster or group at each level should be large enough so that the quality of the MMSE solution is not compromised.

The time offsets for the macro eNBs may be determined based on MMSE, as described above. The time offsets for the macro eNBs may also be determined based on least squares or some other technique.

In another design, the time offsets for macro eNBs may be determined based on a connected graph. The graph may include (i) nodes corresponding to macro eNBs and (ii) edges connecting the nodes and corresponding to TDOA measurements. An initial macro eNB may be selected for the graph, and the time offset for this eNB may be set to zero, e.g., eNB1_Offset=0. The graph may then be built by adding TDOA 'edges'. In one design, edges that connect existing nodes in the graph to isolated nodes may be selected, without having to adjust the time offsets for already connected nodes when attaching a new edge. In another design, any edge may be selected, and the time offsets for already connected nodes may be adjusted for the selected edge. For both designs, a new edge that connects two nodes may be added if a loop would not be created. If a loop would be created, then the new edge may be either discarded or added with some procedure to modify the time offset of the two nodes that the new edge is connecting. The process may be repeated until all edges have been considered. The process may be iteratively performed (e.g., starting with a different initial macro eNB, or by considering the edges in a different order, etc.). In any case, after completing the process, the mean time offset for all nodes in the graph may be determined and subtracted from the time offset for each node. This may then result in devices following the mean time drift for all nodes in the graph.

Devices may obtain TDOA measurements for different macro eNBs based on periodic time instead of absolute time. For example, each macro eNB may transmit a synchronization signal every Q milliseconds (ms). The devices may measure the receive time for each macro eNB based on the synchronization signal transmitted by that macro eNB. The devices may then obtain TDOA measurements for different macro eNBs modulo Q, which may result in errors in time offsets derived based on the TDOA measurements. For example, three macro eNBs denoted as eNB1, eNB2 and eNB3 may be present and may have true time offsets of 0, 2, and 4 respectively. Three TDOA measurements may be obtained and may include TDOA(2, 1)=2, TDOA(3, 2)=2, and TDOA(1, 3)=1. TDOA(1, 3) should be −4 but is measured to be 1 due to periodic time. The time offsets for the three macro eNBs may be computed as −0.33, 0.00, and +0.33 based on the reported TDOA measurements while the correct time offsets should be −1.93, 0.00, and +1.93.

Potential errors due to modulo-Q TDOA measurements may be resolved by using both a reported TDOA measurement and its modulo-Q version if the reported TDOA measurement is close to Q/2. In particular, if the reported TDOA measurement is T, then time offsets may be computed for two hypotheses of T and −(Q−T) for this reported TDOA measurement. Periodicity Q may be increased by reading system frame number (SFN) of the macro eNBs.

In one design, devices may measure receive times for macro eNBs or make TDOA measurements for different macro eNBs at any time selected by the devices. The devices may report time offsets or TDOA measurements to synchronization server 140 at any time selected by the devices. In another design, the devices may measure receive time for a particular macro eNB at the same time or may make TDOA measurements for different macro eNBs at the same time. A coordinated silence scheme may be used in which all devices may blank (or not transmit) at the same time to monitor base stations, which may then prevent one device's transmission from interfering with another device's reception.

As shown in equation (3), the time offset for a macro eNB may be determined based on the receive time for the macro eNB at a device. As shown in equation (4), the TDOA for a pair of macro eNBs may be measured based on the receive times for these macro eNBs at a device. The receive time for a macro eNB at a device may be dependent on the transmit time of the macro eNB as well as the propagation delay between the macro eNB and the device, as shown in FIG. 2. The time offset computed in equation (3) and the TDOA measurement computed in equation (4) may both be affected by the propagation delay between the device and each macro eNB.

In one design, propagation delay may be compensated for by using the largest possible time offset from UTC time (for the first design described above) or the smallest absolute TDOA (for the second design), since these may likely correspond to cell edge devices. For the first design, a set of devices may report a set of time offsets for a given macro eNB. The largest time offset in the set of time offsets may correspond to the time offset from a device located near coverage edge. This largest time offset may be selected for use or may be given greater weight in averaging. For the second design, a set of devices may report a set of TDOA measurements for a pair of macro eNBs. The smallest TDOA measurement in the set of TDOA measurements may correspond to the TDOA measurement from a device located near coverage edge. This smallest TDOA measurement may be selected for use to compute time offsets for the macro eNBs or may be given greater weight in averaging.

In one design, a given device X may obtain a time offset for a macro eNB from synchronization server 140 and may set its transmit time based on its receive time for the macro eNB and the time offset, as described above. In one design, other devices may set their transmit times based on their receive times for another device (e.g., device X) using a multi-hop scheme. Device X and the other devices may then transmit at approximately the same time. For example, two HeNBs may be within the coverage of the macro eNB. The first HeNB may set its transmit time based on its receive time for the macro eNB and the time offset for the macro eNB. The second HeNB may set its transmit time based on the receive time for the first HeNB. UEs within the coverage of the first and second HeNBs may set their transmit time based on their receive times for the first and second HeNBs, respectively. The HeNBs and their UEs may then be synchronized.

In another aspect, a device may perform radio frame alignment and may determine radio frame boundary of a macro eNB based on a radio frame offset, which may be provided by synchronization server 140 or some other entity. The device may be able to obtain UTC time from GNSS, or IEEE 1588v2, or some other technique. However, the device may not know the radio frame boundary of the macro eNB. Synchronization server 140 may provide a radio frame offset with respect to a particular UTC time (e.g., 00:00 on Jan. 6, 1980). The device may use its estimate of UTC time and the radio frame offset to determine the radio frame boundary of the macro eNB. Radio frame alignment may be especially important in a TDD wireless network in order to avoid interference between downlink transmissions and uplink transmissions sent on the same frequency channel. The device may also determine the SFN to use based on SFN information from synchronization server 140.

In general, devices synchronized to macro eNBs may utilize the same radio technology as the macro eNBs or different radio technologies. For example, a device (e.g., a HeNB) may communicate with another device (e.g., a UE) using the same radio technology (e.g., LTE) used by the macro eNBs. Alternatively, a device (e.g., a HeNB) may receive signals from macro eNBs using one radio technology (e.g., LTE) and may communicate with another device (e.g., a UE) using another radio technology (e.g., Wi-Fi).

The techniques described herein may be used for time synchronization, as described above. For time synchronization, a device may set its transmit time based on a time offset for a macro eNB. The techniques may also be used for frequency synchronization, e.g., if different macro eNBs have different frequencies. For frequency synchronization, a device may set its carrier frequency based on a carrier frequency for a macro eNB and a frequency offset, which may be provided by synchronization server 140. Different frequency offsets may be determined for different macro eNBs such that the carrier frequencies of different devices are approximately aligned even when the carrier frequencies of the macro eNBs are different.

The techniques described herein may enable devices (e.g., HeNBs, UEs, relays, etc.) to achieve synchronization via macro eNBs that may be asynchronous. The macro eNBs may operate in the normal manner and may be unaffected by the operation of the devices to achieve synchronization. The devices may communicate with synchronization server 140 (or a designated network entity) to obtain time offsets. The time offsets may be sent via signaling messages that may be forwarded by the macro eNBs. The techniques may be applicable to existing second generation (2G) and third generation (3G) wireless networks as well as new fourth generation (4G) wireless networks.

Synchronization server 140 may receive time difference information (e.g., time offsets and/or TDOA measurements) from devices and may determine time offsets for macro eNBs. In one design, synchronization server 140 may be part of an existing network entity such as an MME, a HeNB Management Server (HMS), an Operation, Administration and Maintenance (OAM) server, a location server, or some other network entity. In another design, synchronization server 140 may be a separate network entity that can support synchronization of devices. In one design, a single synchronization server may serve all geographic areas. In another design, multiple synchronization servers may serve different geographic areas and may exchange messages to compute time offsets at the boundaries of their coverage.

Figure 3:
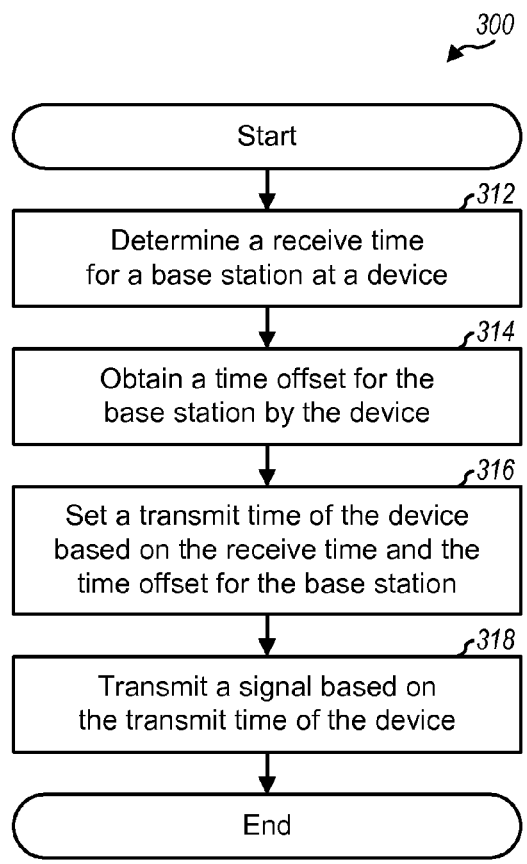
FIG. 3 shows a process for determining a transmit time of a device.

FIG. 3 shows a design of a process 300 for determining transmit time. Process 300 may be performed by a device, which may be a HeNB, a UE, a relay, or some other entity. The device may determine a receive time for a base station, which may be a macro base station that is asynchronous with at least one other macro base station in a wireless network (block 312). The device may obtain a time offset for the base station, e.g., from a network entity (block 314). In one design, the time offset may be determined based on a reference time, e.g., UTC time. In another design, the time offset may be determined based on TDOA measurements for a plurality of base stations.

The device may set its transmit time based on the receive time and the time offset for the base station, e.g., as shown in equation (1) (block 316). The device may also determine a propagation delay between the base station and the device and may set its transmit time based further on the propagation delay, e.g., as shown in equation (2).

In one design, the device may transmit a signal based on its transmit time (block 318). The signal may be synchronous with a second signal transmitted by a second device, which may have a transmit time that is set based on a second time offset for a second base station. The base station and the second base station may be asynchronous. In one design, the time offset for the base station may be zero, and the second time offset for the second base station may be non-zero. The device and the second device may both be synchronized to the base station. In another design, the time offset for the base station and the second time offset for the second base station may be determined based on a reference time. The device and the second device may both be synchronized to the reference time. In one design, another device may be synchronized to the device based on the signal transmitted by the device.

In one design, the device may perform radio frame alignment and may determine UTC time. The device may then determine radio frame boundary of the base station based on the UTC time and the time offset for the base station.

In one design, the device may perform frequency synchronization. The device may determine a carrier frequency of the base station at the device. The device may obtain a frequency offset for the base station (e.g., from the network entity) and may set its carrier frequency based on the carrier frequency of the base station and the frequency offset for the base station.

Figure 4:
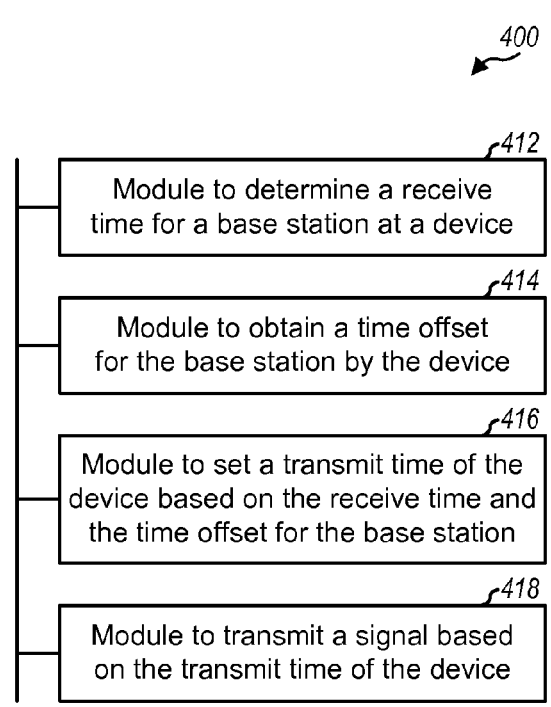
FIG. 4 shows an apparatus for determining a transmit time of a device.

FIG. 4 shows a design of an apparatus 400 for determining transmit time. Apparatus 400 includes a module 412 to determine a receive time for a base station at a device, a module 414 to obtain a time offset for the base station by the device, a module 416 to set a transmit time of the device based on the receive time and the time offset for the base station, and a module 418 to transmit a signal based on the transmit time of the device.

FIG. 5 shows a design of a process 500 for supporting synchronization. Process 500 may be performed by a device, which may be a HeNB, a UE, a relay, or some other entity. The device may determine time difference information for at least one base station (block 512). The device may send the time difference information to a network entity (e.g., a synchronization server) for use to determine at least one time offset for the at least one base station (block 514).

FIG. 6 shows a design of a process 600 for determining time difference information. Process 600 may be one design of block 512 in FIG. 5. The device may determine a receive time for a base station at the device (block 612). The device may determine a time offset for the base station based on the receive time for the base station and a reference time, e.g., as shown in equation (3) (block 614). The reference time may be based on UTC time, which may be obtained from a GNSS such as GPS. The device may also determine a propagation delay between the base station and the device and may determine the time offset for the base station based further on the propagation delay. The time difference information in block 512 in FIG. 5 may comprise the time offset for the base station.

FIG. 7 shows a design of a process 700 for determining time difference information. Process 700 may be another design of block 512 in FIG. 5. The device may determine a first receive time for a first base station at the device (block 712) and may also determine a second receive time for a second base station at the device (block 714). The device may determine a TDOA measurement for the first and second base stations based on the first and second receive times for the first and second base stations, e.g., as shown in equation (4) (block 716). The device may also obtain a first time offset for the first base station and a second time offset for the second base station. The device may then determine the TDOA measurement for the first and second base stations based further on the first and second time offsets, e.g., as shown in equation (5). The time difference information in block 512 in FIG. 5 may comprise the TDOA measurement.

In one design, the device may also support frequency synchronization. The device may determine frequency difference information for the at least one base station and may send the frequency difference information to the network entity for use to determine at least one frequency offset for the at least one base station. In one design, the frequency difference information may comprise a frequency offset for a base station. The device may determine a carrier frequency of a base station at the device and may determine the frequency offset for the base station based on the carrier frequency of the base station and a reference frequency. The reference frequency may be from a GNSS or some other reference source.

In one design, the device may receive at least one signal transmitted by the at least one base station (e.g., at least one macro eNB) based on a first radio technology. The device may determine the time difference information for the at least one base station based on the at least one received signal. In one design, the device (e.g., a HeNB) may communicate with another device (e.g., a UE) based on the first radio technology. In another design, the device may communicate with another device based on a second radio technology that is different from the first radio technology. The radio technology used to determine the time difference information may thus be the same as, or different from, the radio technology used for communication by the device.

FIG. 8 shows a design of an apparatus 800 for supporting synchronization. Apparatus 800 includes a module 812 to determine time difference information (e.g., a time offset or a TDOA measurement) for at least one base station by a device, and a module 814 to send the time difference information to a network entity for use to determine at least one time offset for the at least one base station.

Figure 9:
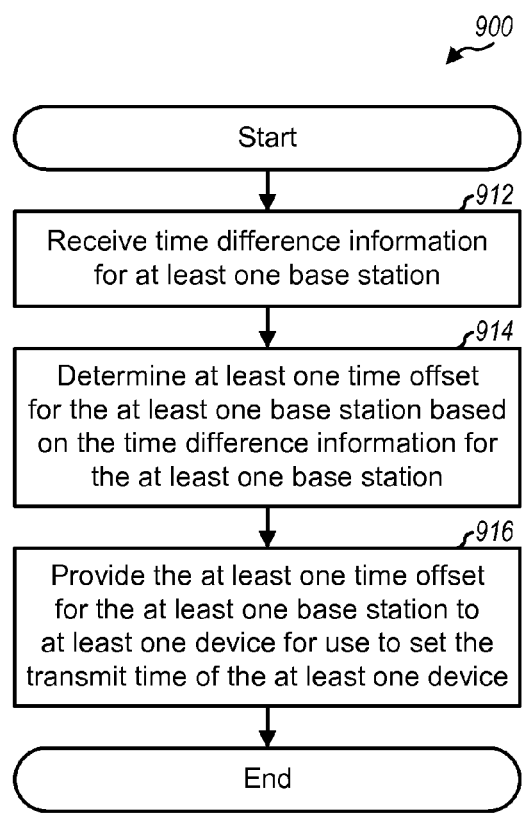
FIG. 9 shows a process for supporting synchronization by a network entity.

FIG. 9 shows a design of a process 900 for supporting synchronization. Process 900 may be performed by a network entity, which may be a synchronization server, or an MME, or a HMS, or an OAM server, or a location server, or some other entity. The network entity may receive time difference information for at least one base station, which may be asynchronous (block 912). The network entity may determine at least one time offset for the at least one base station based on the time difference information for the at least one base station (block 914). The network entity may provide the at least one time offset for the at least one base station to at least one device for use to set the transmit time of the at least one device (block 916).

In one design, the time difference information may comprise the at least one time offset for the at least one base station and may be received from one or more devices. The network entity may provide a time offset for a base station received from a device to other devices, which may be synchronizing to or communicating with the base station. The network entity may also receive a plurality of time offsets for the base station, e.g., from different devices. The network entity may average the plurality of time offsets to obtain the time offset for the base station. The network entity may also select the largest time offset among the plurality of time offsets as the time offset for the base station.

In another design, the time difference information may comprise TDOA measurements for a plurality of base stations. The network entity may determine a plurality of time offsets for the plurality of base stations based on the TDOA measurements for the plurality of base stations, e.g., with MMSE computation. In one design, the network entity may set the time offset for one of the plurality of base stations to zero. Devices may then be synchronized to the timing of this one base station. In another design, the network entity may set the time offsets for different base stations to zero in different time intervals. In one design, the network entity may receive multiple TDOA measurements for a given pair of base stations and may use the smallest TDOA measurement among these multiple TDOA measurements to determine the time offsets for the base stations.

In one design, the network entity may support frequency synchronization. The network entity may receive frequency difference information for the at least one base station and may determine at least one frequency offset for the at least one base station based on the frequency difference information for the at least one base station. The network entity may provide the at least one frequency offset for the at least one base station to devices for use to set the carrier frequency of each device.

Figure 10:
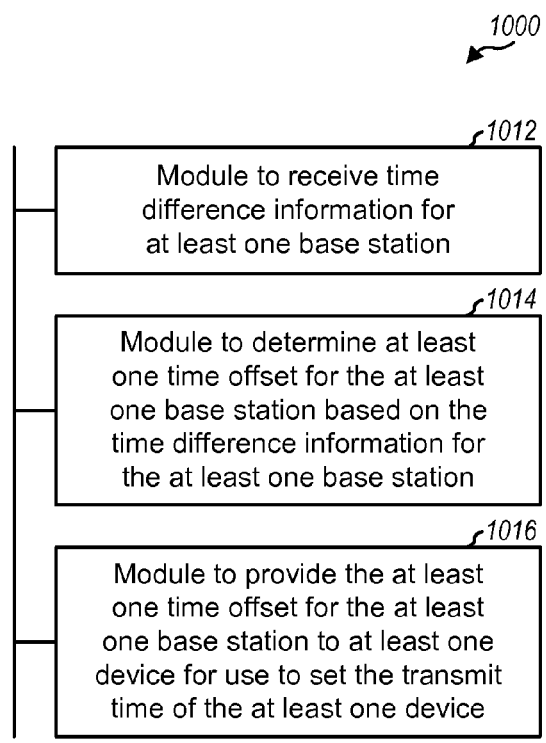
FIG. 10 shows an apparatus for supporting synchronization by a network entity.

FIG. 10 shows a design of an apparatus 1000 for supporting synchronization. Apparatus 1000 includes a module 1012 to receive time difference information for at least one base station, a module 1014 to determine at least one time offset for the at least one base station based on the time difference information for the at least one base station, and a module 1016 to provide the at least one time offset for the at least one base station to at least one device for use to set the transmit time of the at least one device.

The modules in FIGS. 4, 8 and 10 may comprise processors, electronic devices, hardware devices, electronic components, logical circuits, memories, software codes, firmware codes, etc., or any combination thereof.

Figure 11:
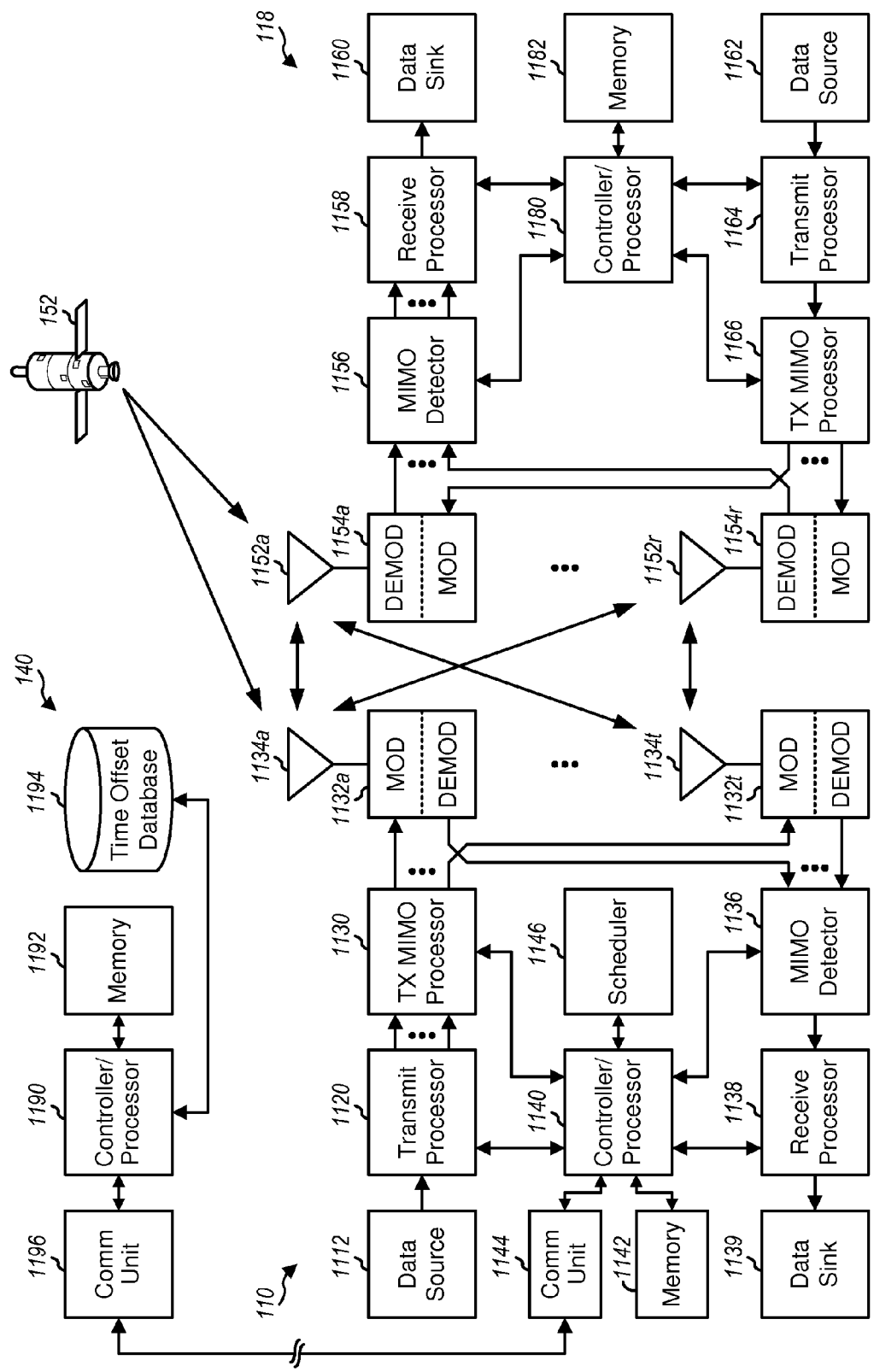
FIG. 11 shows a block diagram of a base station, a device, and a synchronization server.

FIG. 11 shows a block diagram of a design of a macro base station/eNB 110 and a device 118. Device 118 may be a HeNB, a UE, a relay, or some other entity. Base station 110 may be equipped with T antennas 1134a through 1134t, and device 118 may be equipped with R antennas 1152a through 1152r, where in general T≥1 and R≥1.

At base station 110, a transmit processor 1120 may receive data from a data source 1112 and control information (e.g., messages carrying time offsets) from a controller/processor 1140. Processor 1120 may process (e.g., encode and modulate) the data and control information to obtain data symbols and control symbols, respectively. Processor 1120 may also generate reference symbols for synchronization signals, reference signals, etc. A transmit (TX) multiple-input multiple-output (MIMO) processor 1130 may perform spatial processing (e.g., precoding) on the data symbols, the control symbols, and/or the reference symbols, if applicable, and may provide T output symbol streams to T modulators (MODs) 1132a through 1132t. Each modulator 1132 may process a respective output symbol stream (e.g., for OFDM, etc.) to obtain an output sample stream. Each modulator 1132 may further process (e.g., convert to analog, amplify, filter, and upconvert) the output sample stream to obtain a downlink signal. T downlink signals from modulators 1132a through 1132t may be transmitted via T antennas 1134a through 1134t, respectively.

At device 118, antennas 1152a through 1152r may receive the downlink signals from base station 110 and other base stations and may provide received signals to demodulators (DEMODs) 1154a through 1154r, respectively. Each demodulator 1154 may condition (e.g., filter, amplify, downconvert, and digitize) a respective received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for device 118 to a data sink 1160, and provide decoded control information to a controller/processor 1180.

On the uplink, at device 118, a transmit processor 1164 may receive data from a data source 1162 and control information (e.g., time difference information) from controller/processor 1180. Processor 1164 may process (e.g., encode and modulate) the data and control information to obtain data symbols and control symbols, respectively. Processor 1164 may also generate reference symbols for a reference signal. The symbols from transmit processor 1164 may be precoded by a TX MIMO processor 1166 if applicable, further processed by modulators 1154a through 1154r (e.g., for SC-FDM, OFDM, etc.), and transmitted to base station 110 and possibly other base stations. At base station 110, the uplink signals from device 118 and other devices may be received by antennas 1134, processed by demodulators 1132, detected by a MIMO detector 1136 if applicable, and further processed by a receive processor 1138 to obtain decoded data and control information sent by device 118 and other devices. Processor 1138 may provide the decoded data to a data sink 1139 and the decoded control information to controller/processor 1140.

Controllers/processors 1140 and 1180 may direct the operation at base station 110 and device 118, respectively. Processor 1180 and/or other processors and modules at device 118 may perform or direct process 300 in FIG. 3, process 500 in FIG. 5, process 600 in FIG. 6, process 700 in FIG. 7, and/or other processes for the techniques described herein. Memories 1142 and 1182 may store data and program codes for base station 110 and device 118, respectively. A communication (Comm) unit 1144 may enable base station 110 to communicate with other network entities. A scheduler 1146 may schedule devices for data transmission on the downlink and/or uplink.

Device 118 may have GNSS capability and may make measurements for signals from satellites 152. These measurements may be processed to obtain UTC time, a location estimate for device 118, etc. Alternatively, device 118 may not have GNSS capability.

FIG. 11 also shows a design of synchronization server 140 in FIG. 1. Within synchronization server 140, a controller/processor 1190 may perform various functions to support synchronization of devices. A memory 1192 may store program codes and data for synchronization server 140. A storage unit 1194 may store time difference information received from devices, time offsets for base stations, and/or other information pertinent for synchronization of devices. A communication unit 1196 may enable synchronization server 140 to communicate with other network entities. Controller/processor 1190 may receive time difference information from devices, determine time offsets for base stations, and provide the time offsets to requesting devices. Controller/processor 1190 may also perform process 900 in FIG. 9 and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining a receive time for a first base station at a first device;
   obtaining a first time offset for the first base station by the first device;
   setting a first transmit time of the first device based on the receive time and the first time offset for the first base station; and
   transmitting a first signal based on the first transmit time of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
   wherein the first time offset for the first base station and the second time offset for the second base station are determined based on at least one of time difference of arrival (TDOA) measurements for the plurality of base stations, or a reference time to which the first device and the second device are synchronized.

2. The method of claim 1, further comprising:
   determining a propagation delay between the first base station and the first device, wherein the first transmit time of the first device is set based further on the propagation delay.

3. The method of claim 1, wherein the first time offset for the first base station is zero and the second time offset for the second base station is non-zero, and the first device and second device are synchronized to the first base station.

4. The method of claim 1, further comprising:
   transmitting a third signal based on the first transmit time of the first device, wherein a third device is synchronized to the first device based on the third signal transmitted by the first device.

5. The method of claim 1, further comprising:
   determining a coordinated universal time (UTC) by the first device; and
   determining a radio frame boundary of the first base station based on the UTC time and the first time offset for the first base station.

6. The method of claim 1, further comprising:
   determining a carrier frequency of the first base station at the first device;
   obtaining a frequency offset for the first base station by the first device; and
   setting a carrier frequency of the first device based on the carrier frequency of the first base station and the frequency offset for the first base station.

7. The method of claim 1, wherein the first base station comprises a macro base station, and the first device comprises a home base station, or a user equipment (UE), or a relay.

8. An apparatus for wireless communication, comprising:
   means for determining a receive time for a first base station at a first device;
   means for obtaining a first time offset for the first base station by the first device;
   means for setting a first transmit time of the first device based on the receive time and the first time offset for the first base station; and
   means for transmitting a first signal based on the first transmit time of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals, wherein the first time offset for the first base station and the second time offset for the second base station are determined based on at least one of time difference of arrival (TDOA) measurements for the plurality of base stations, or a reference time to which the first device and the second device are synchronized.

9. The apparatus of claim 8, further comprising:
means for determining a propagation delay between the first base station and the first device, wherein the first transmit time of the first device is set based further on the propagation delay.

10. The apparatus of claim 8, further comprising:
means for transmitting a third signal based on the first transmit time of the first device, wherein a third device is synchronized to the first device based on the third signal transmitted by the first device.

11. An apparatus for wireless communication, comprising:
at least one processor configured to:
  determine a receive time for a first base station at a first device,
  obtain a first time offset for the first base station by the first device,
  set a first transmit time of the first device based on the receive time and the first time offset for the first base station, and
  transmit a first signal based on the first transmit time of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

12. The apparatus of claim 11, wherein the at least one processor is configured to determine a propagation delay between the first base station and the first device, and to set the first transmit time of the first device based further on the propagation delay.

13. The apparatus of claim 11, wherein the at least one processor is configured to transmit a third signal based on the first transmit time of the first device, and a third device is synchronized to the first device based on the third signal transmitted by the first device.

14. A non-transitory computer-readable medium comprising:
code for causing at least one computer to determine a receive time for a first base station at a first device,
code for causing the at least one computer to obtain a first time offset for the first base station by the first device,
code for causing the at least one computer to set a first transmit time of the first device based on the receive time and the first time offset for the first base station, and
code for causing the at least one computer to transmit a first signal based on the first transmit time of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

15. A method for wireless communication, comprising:
determining time difference information for a first base station by a first device;
sending the time difference information to a network entity to determine a first time offset for the first base station; and
transmitting a first signal based in part on the first time offset, wherein the first signal is synchronous with a second signal transmitted by a second device having a transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

16. The method of claim 15, wherein the determining the time difference information for the first base station comprises
determining a receive time for the first base station at the first device, and
determining the first time offset for the first base station based on the receive time for the first base station and the reference time, wherein the time difference information comprises the first time offset for the first base station.

17. The method of claim 15, wherein the determining the time difference information for the first base station comprises
determining a first receive time for the first base station at the first device,
determining a second receive time for the second base station at the first device, and
determining a time difference of arrival (TDOA) measurement for the first and second base stations based on the first receive time for the first base station and the second receive time for the second base station, wherein the time difference information comprises the TDOA measurement.

18. The method of claim 15, further comprising:
determining frequency difference information for the first base station by the first device; and
sending the frequency difference information to the network entity to determine a frequency offset for the first base station.

19. The method of claim 15, further comprising:
receiving at least one signal transmitted by the first base station based on a first radio technology, wherein the time difference information for the first base station is determined based on the at least one received signal; and
communicating with the second device based on a second radio technology different from the first radio technology.

20. The method of claim 15, wherein the first base station comprises a macro base station, and the first device comprises a home base station, or a user equipment (UE), or a relay.

21. The method of claim 16, wherein the reference time is based on a coordinated universal time (UTC).

22. The method of claim 16, wherein the reference time is based on a Global Navigation Satellite System (GNSS).

23. The method of claim 16, further comprising:
determining a propagation delay between the first base station and the first device, wherein the first time offset for the first base station is determined based further on the propagation delay.

24. The method of claim 17, wherein the determining the time difference information for the first base station further comprises
obtaining the first time offset for the first base station,
obtaining the second time offset for the second base station, and
determining the TDOA measurement for the first and second base stations based further on the first and second time offsets.

25. The method of claim 18, wherein the determining the frequency difference information for the first base station comprises
determining a carrier frequency of the first base station at the first device; and
determining the frequency offset for the first base station based on the carrier frequency of the first base station and a reference frequency, wherein the frequency difference information comprises the frequency offset for the first base station.

26. An apparatus for wireless communication, comprising:
means for determining time difference information for a first base station by a first device;
means for sending the time difference information to a network entity to determine a first time offset for the first base station; and
means for transmitting a first signal based in part on the first time offset, wherein the first signal is synchronous with a second signal transmitted by a second device having a transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

27. The apparatus of claim 26, wherein the means for determining the time difference information for the first base station comprises
means for determining a receive time for the first base station at the first device, and
means for determining the first time offset for the first base station based on the receive time for the first base station and the reference time, wherein the time difference information comprises the first time offset for the first base station.

28. The apparatus of claim 26, wherein the means for determining the time difference information for the first base station comprises
means for determining a first receive time for the first base station at the first device,
means for determining a second receive time for the second base station at the first device, and
means for determining a time difference of arrival (TDOA) measurement for the first and second base stations based on the first receive time for the first base station and the second receive time for the second base station, wherein the time difference information comprises the TDOA measurement.

29. The apparatus of claim 26, further comprising:
means for receiving at least one signal transmitted by the first base station based on a first radio technology, wherein the time difference information for the first base station is determined based on the at least one received signal; and
means for communicating with the second device based on a second radio technology different from the first radio technology.

30. The apparatus of claim 28, wherein the means for determining the time difference information for the first base station further comprises
means for obtaining the first time offset for the first base station,
means for obtaining the second time offset for the second base station, and
means for determining the TDOA measurement for the first and second base stations based further on the first and second time offsets.

31. An apparatus for wireless communication, comprising:
at least one processor configured to:
determine time difference information for a first base station by a first device,
send the time difference information to a network entity to determine a first time offset for the first base station, and
transmit a first signal based in part on the first time offset, wherein the first signal is synchronous with a second signal transmitted by a second device having a transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

32. A non-transitory computer-readable medium comprising:
code for causing at least one computer to determine time difference information for a first base station by a first device,
code for causing the at least one computer to send the time difference information to a network entity to determine a first time offset for the first base station; and code for causing the at least one computer to transmit a first signal based in part on the first time offset, wherein the first signal is synchronous with a second signal transmitted by a second device having a transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals, wherein the first time offset for the first base station and the second time offset for the second base station are determined based on at least one of time difference of arrival (TDOA) measurements for the plurality of base stations, or a reference time to which the first device and the second device are synchronized.

33. A method for wireless communication, comprising:
receiving time difference information for a first base station by a network entity;
determining a first time offset for the first base station based on the time difference information for the first base station; and
providing the first time offset for the first base station to a first device to set a first transmit time of a first signal of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

34. The method of claim 33, wherein the time difference information comprises the first time offset for the first base station and is received from one or more devices.

35. The method of claim 33, wherein the receiving the time difference information for the first base station comprises receiving a plurality of time offsets for the first base station, and wherein the determining the first time offset for the first base station comprises selecting a largest time offset among the plurality of time offsets as the first time offset for the first base station.

36. The method of claim 33, wherein the determining the first time offset for the first base station comprises determining a plurality of time offsets for the plurality of base stations based on the TDOA measurements for the plurality of base stations.

37. The method of claim 33, wherein the receiving the time difference information for the first base station comprises receiving a plurality of time difference of arrival (TDOA) measurements for a pair of base stations, and wherein the determining the first time offset for the first base station comprises determining the first time offset based on a smallest TDOA measurement among the plurality of TDOA measurements for the pair of base stations.

38. The method of claim 33, further comprising:
receiving frequency difference information for the first base station by the network entity;
determining at least one frequency offset for the first base station based on the frequency difference information for the first base station; and
providing the at least one frequency offset for the first base station to one or more devices to set a carrier frequency of the one or more devices.

39. The method of claim 33, wherein the network entity comprises a Mobility Management Entity (MME), or a HeNB Management Server (HMS), or an Operation, Administration and Maintenance (OAM) server, or a location server.

40. The method of claim 36, wherein the determining the plurality of time offsets comprises determining the plurality of time offsets based on a minimum mean square error (MMSE) computation.

41. The method of claim 36, wherein the determining the plurality of time offsets comprises setting a time offset for one of the plurality of base stations to zero.

42. An apparatus for wireless communication, comprising:
means for receiving time difference information for a first base station by a network entity;
means for determining a first time offset for the first base station based on the time difference information for the first base station; and
means for providing the first time offset for the first base station to a first device to set a first transmit time of a first signal of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals,
wherein the first time offset for the first base station and the second time offset for the second base station are determined based on at least one of time difference of arrival (TDOA) measurements for the plurality of base stations, or a reference time to which the first device and the second device are synchronized.

43. The apparatus of claim 42, wherein the time difference information comprises the first time offset for the first base station and is received from one or more devices.

44. The apparatus of claim 42, wherein the means for determining the first time offset for the first base station comprises means for determining a plurality of time offsets for the plurality of base stations based on the TDOA measurements for the plurality of base stations.

45. An apparatus for wireless communication, comprising:
at least one processor configured to:
receive time difference information for a first base station by a network entity,
determine a first time offset for the first base station based on the time difference information for the first base station, and
provide the first time offset for the first base station to a first device to set a first transmit time of a first signal of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals, wherein the first time offset for the first base station and the second time offset for the second base station are determined based on at least one of time difference of arrival (TDOA) measurements for the plurality of base stations, or a reference time to which the first device and the second device are synchronized.

46. A non-transitory computer-readable medium comprising:

code for causing at least one computer to receive time difference information for a first base station by a network entity, code for causing the at least one computer to determine a first time offset for the first base station based on the time difference information for the first base station, and code for causing the at least one computer to provide the first time offset for the first base station to a first device to set a first transmit time of a first signal of the first device, wherein the first signal is synchronous with a second signal transmitted by a second device having a second transmit time set based on a second time offset for a second base station, the first base station and the second base station are asynchronous, each of the first and second time offsets is periodically updated based on a mean timing drift of a plurality of base stations, and the mean timing drift is determined by setting a time offset associated with each of the plurality of base stations to zero at different time intervals, wherein the first time offset for the first base station and the second time offset for the second base station are determined based on at least one of time difference of arrival (TDOA) measurements for the plurality of base stations, or a reference time to which the first device and the second device are synchronized.

\* \* \* \* \*